R. L. OWENS.
FEED HOPPER FOR GRAIN CLEANING MACHINES.
APPLICATION FILED FEB. 21, 1919.

1,400,234.

Patented Dec. 13, 1921.

Inventor:
Richard L. Owens.
By Paul & Paul
his Attorneys.

ated Dec. 13, 1921.

UNITED STATES PATENT OFFICE.

RICHARD L. OWENS, OF MINNEAPOLIS, MINNESOTA.

FEED-HOPPER FOR GRAIN-CLEANING MACHINES.

1,400,234. Specification of Letters Patent. Patented Dec. 13, 1921.

Original application filed February 24, 1917, Serial No. 208,577. Divided and this application filed February 21, 1919. Serial No. 278,446.

*To all whom it may concern:*

Be it known that I, RICHARD L. OWENS, a citizen of the United States, resident of Minneapolis, county of Hennepin, State of Minnesota, have invented certain new and useful Improvements in Feed-Hoppers for Grain-Cleaning Machinery, of which the following is a specification.

The object of my invention is to provide a feeding apparatus to be installed in the hopper of a grain cleaning machine which will positively prevent the grain from clogging and interrupting the operation of the machine.

A further and particular object is to provide means for regulating the cross sectional area of the feed throat or passage for the purpose of obtaining the desired degree of suction therein, this area-regulating means operating in coöperation with the device for regulating the feed of the stream of grain.

Other objects of the invention will appear from the following detailed description.

This application is a division of application Serial No. 208,577, filed February 24, 1917.

Figure 1:
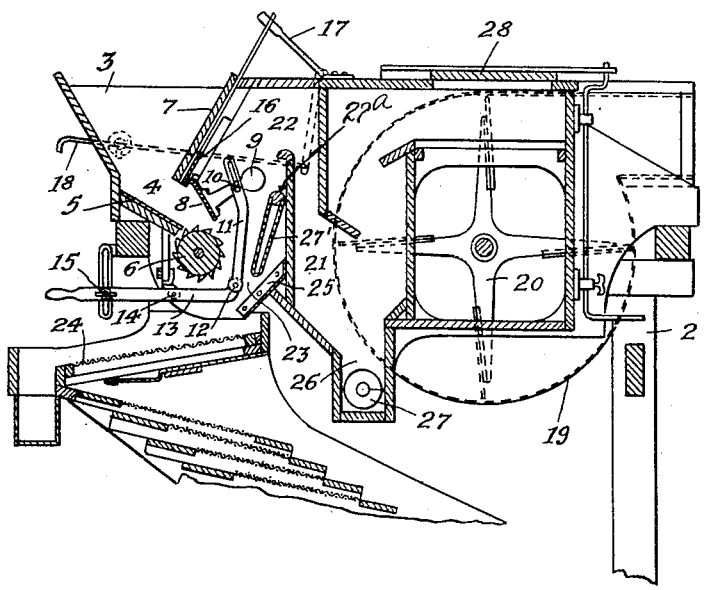
Figure 2:
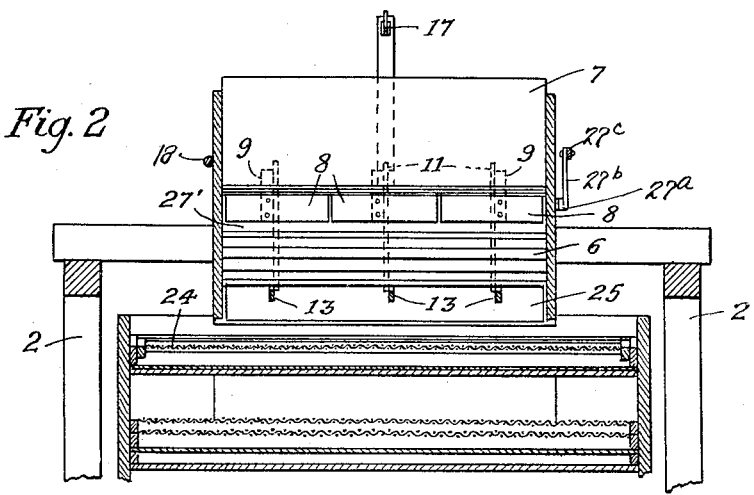

In the accompanying drawings forming part of this specification,

Figure 1 is a vertical sectional view through a grain cleaning machine embodying my invention, Fig. 2 is a vertical sectional view, on the line 2—2 of Fig. 1.

In the drawing, 2 represents the frame of the machine and 3 the hopper into which the grain to be cleaned is discharged by suitable means, not shown. The walls of the hopper are inclined in the usual way and at the bottom is a side opening discharge throat 4 formed between the lower edge of the hopper wall and an inclined feed plate 5 on which the grain rests in its passage through the throat. At the lower edge of the feed plate is a force feed roll 6 having a toothed periphery upon which the grain is delivered from the feed plate. The pressure, however, or weight of the grain is sustained by the plate so that as the grain passes off the lower end of the plate it will be engaged by the feed roll and advanced through the throat of the hopper without there being any material pressure of the grain on the roll which might tend to wedge or clog the feed. The hopper has an inclined wall 7 above the plate 4, the lower edge of which bounds the upper portion of the throat, and upon this wall a series of gates 8 are hinged. I have shown three of these gates, but a greater number may be employed if preferred. The lower edges of the gates rest by gravity upon the grain as it flows through the throat of the hopper, and each gate is preferably provided with a weight 9 which resists the upward movement of the gate but will allow it to yield and permit the passage through the throat of such foreign material as nails, bolts, straw, or pieces of wood which might accidentally pass into the hopper with the grain, and the lifting of the gates will prevent such foreign material from lodging and interrupting the overflow of the grain out of the hopper.

Each gate has a pin and slot connection at 10 with a bar 11 that is pivoted at 12 to a lever 13 pivoted at 14 and projecting outside the wall of the hopper, where it can be conveniently grasped by the operator for the purpose of shifting the bar 11 with respect to the pin sliding therein and thereby regulate the stroke of the gate.

Each lever 13 is locked by suitable means, such as the link and wing nut device 15. By loosening the wing nut, the levers may be adjusted independently of each other so that the throw or travel of the gates may be varied and as the hopper is of less width than the sieves, I prefer to adjust the lever of the middle gate so that it will have less stroke than the side gates. This will have the effect of directing the stream of grain from the center toward the side walls of the hopper and the side gates, opening wider than the middle one, will allow the grain to spread outwardly to the sides of the sieves beneath.

I also prefer to provide a gate 16 mounted to slide in the wall 7 connected with a crank 17 which is operated by means of a rod 18.

The gate 16 is free to slide with the movement of the crank toward or from the plate 5 and thereby regulate the cross-sectional area of the throat and whenever desired the feed may be stopped entirely by closing this valve and then all the grain which may have passed out of the hopper but is still somewhere on the sieves may be worked out of the machine until the sieves are entirely clear.

Near the hopper is a fan casing 19 for suction fan 20. An air trunk 21 leads from this fan casing to a chamber 22 in the rear of the wall 17 and above the swinging gates. The lower portion of the chamber 22 communicates with a throat 23 through which the grain falls upon a sieve 24 beneath. This throat 23 has the feed roll on one side and an inclined plate 25 on the other side over which the grain falls upon the screen 24 beneath. In the passage of the grain through this throat, it is subjected to the suction of the fan and dust, chaff, fine pieces of straw, etc., are drawn out and up through the chamber 22 and the trunk 21, and deposited in the settling chamber 26 having a side delivery conveyer 27. For regulating the currents of air through the falling grain, I prefer to provide a valve 27' carried by shaft 27ª mounted in the rear of the grain passage adjacent the wall of the trunk 21 and positioned to swing toward or from the feed roll and thereby increase or decrease the cross sectional area of the passage and the lifting force of the air currents passing therethrough, and thereby the separation of the dust and chaff from the grain may be regulated according to the condition of the grain, the size of the kernels, and the foreign matter therein, the shaft 27ª that carries the regulating valve 27' preferably extends through the wall of the casing as shown at the right in Fig. 2, and is provided with a crank at 27ᵇ to which may be connected an operating rod 27ᶜ that extends to a convenient position within control of the operator.

I also prefer to provide a slide 28 in the top of the fan casing by means of which the air currents may be in a sense short-circuited or admitted directly to the fan, instead of being drawn through the grain passage.

In the operation of the machine, the grain is fed into the hopper and allowed to rest upon the feed plate in the bottom thereof and slide over upon the feed roll, the revolution of which will continuously advance the grain through the throat of the hopper for delivery upon the screen beneath. The position of the gates will determine the volume of the feed at one gate may be adjusted to open wider than the other gates, if preferred, while all of the gates will yield under pressure of any foreign material and allow it to pass through and drop upon the sieve beneath for discharge from the machine instead of sticking or wedging in the hopper and clogging the feed. By means of the air valve, the throat may be increased or decreased in cross-sectional area until the desired degree of suction is obtained for the proper separation of the chaff and fine material from the grain.

I do not wish to be confined to the particular arrangement or the manner of mounting the various devices in the hopper and air passage, as in various ways these details may be modified and still be within the scope of my invention.

I claim as my invention:

1. The combination, with a feed hopper having an inclined feed plate arranged below the bottom of the hopper and forming with the hopper wall a side opening discharge throat, of a force-feed roll located below the edge of said feed plate, an adjustable gate arranged above said roll in position to bear on the grain as it passes over said feed plate, a chamber through which the grain passes as it falls from said feed roll, an air regulating valve arranged in said chamber, and a fan and fan-trunk connected to said chamber above said feed roll and regulating valve, for drawing a current of air through said chamber and through the grain as it falls from said feed roll.

2. The combination, with a feed hopper having an inclined feed plate arranged below the bottom of the hopper and forming with the hopper wall a side opening discharge throat, of a force-feed roll located below the edge of said feed plate, a series of independently adjustable gates arranged above said roll in position to bear on the grain as it passes over said feed plate, a chamber through which the grain passes as it falls from said feed roll, and a fan and fan-trunk connected to said chamber above said feed roll, for drawing a current of air through said chamber and through the grain as it falls from said feed roll.

3. The combination, with a feed hopper having an inclined feed plate arranged below the bottom of the hopper and forming with the hopper wall a side opening discharge throat, of a force-feed roll located below the edge of said feed plate, a series of independently adjustable gates arranged above said roll in position to bear on the grain as it passes over said feed plate, means for independently adjusting said gates and regulating their pressure upon the grain, a chamber through which the grain passes as it falls from said feed roll, and a fan and fan-trunk connected to said chamber above said feed roll for drawing a current of air through said chamber and through the grain as it falls from said feed roll.

4. The combination, with a feed hopper having an inclined feed plate arranged below the bottom of the hopper and forming with the hopper wall a side opening discharge throat, of a force-feed roll located below the edge of said feed plate, an adjustable gate arranged above said roll in position to bear on the grain as it passes over said feed plate, a chamber through which the grain passes as it falls from said feed roll, a fan and fan-trunk connected to said chamber above said feed roll, and a settling chamber arranged in said fan-trunk.

5. The combination, with a feed hopper having an inclined feed plate arranged below the bottom of the hopper, and forming with the hopper wall a side opening discharge throat, of a force feed roll located below the edge of said feed plate, an adjustable gate arranged above said roll in position to bear on the grain as it passes over said feed plate, a chamber through which grain passes as it falls from said feed roll, and a fan and fan trunk connected to said chamber above said feed roll for drawing a current of air through said chamber, and through the grain as it falls from said feed roll.

In witness whereof, I have hereunto set my hand this 13th day of February, 1919.

RICHARD L. OWENS.